Figure 1:
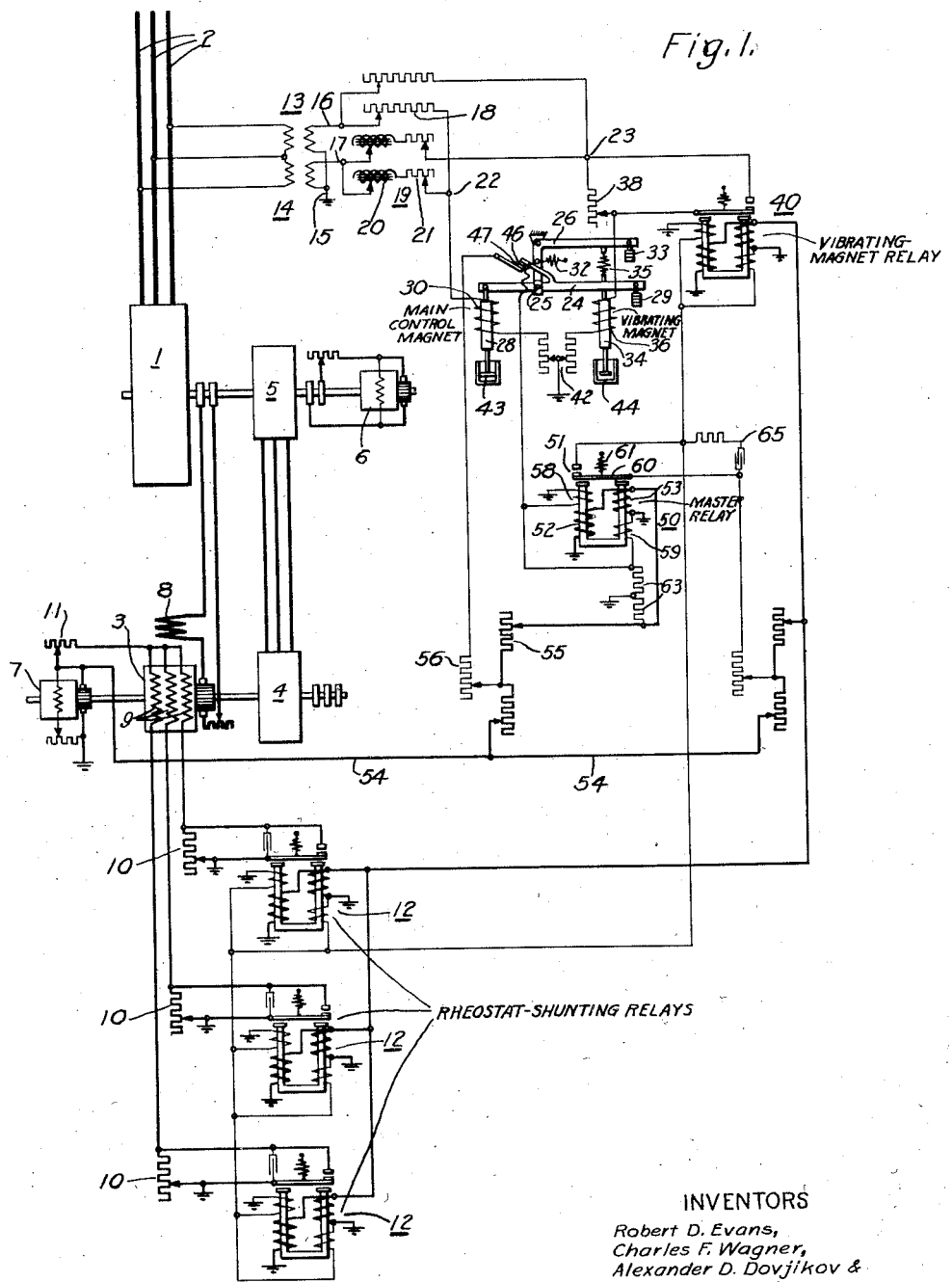

INVENTORS
Robert D. Evans,
Charles F. Wagner,
Alexander D. Dovjikov &
Errol B. Shand
BY
ATTORNEY Nov. 20, 1928.  1,692,495
R. D. EVANS ET AL
QUICK EXCITED MACHINE AND SYSTEM OF TRANSMISSION
Filed Sept. 9, 1927    3 Sheets-Sheet 3

| No. | Cir. | Exc. | R.P.M. |
|---|---|---|---|
| 81 | 3 | Sep. | 300 |
| 82 | 2 | Self | 300 |
| 83 | 2 | Sep. | 300 |
| 84 | 4 | Sep. | 970 |
| 85 | 4 | Sep. | 1200 |
| 86 | 4 | Sep. | 1200 |
| 87 | 1 | Self | 180 |

INVENTORS
Robert D. Evans,
Charles F. Wagner,
Alexander D. Dovjikov &
Errol B. Shand
BY
ATTORNEY

UNITED STATES PATENT OFFICE.

ROBERT D. EVANS, OF PITTSBURGH, CHARLES F. WAGNER, OF SWISSVALE, ALEXANDER D. DOVJIKOV, OF WILKINSBURG, AND ERROL B. SHAND, OF PITTSBURGH, PENNSYLVANIA, ASSIGNORS TO WESTINGHOUSE ELECTRIC & MANUFACTURING COMPANY, A CORPORATION OF PENNSYLVANIA.

QUICK-EXCITED MACHINE AND SYSTEM OF TRANSMISSION.

Application filed September 9, 1927. Serial No 218,432.

Our invention relates to quick-response excitation systems for effecting important increases in the amount of power that may be transmitted in a system consisting of synchronous machines connected through reactances, both during steady-state conditions of operation and during transient conditions.

Two of the fundamental requirements for transient stability are the ability of the synchronous machines to maintain their voltages during disturbances and the ability of the switching equipment to isolate the faulty section of the system as quickly as possible. Our invention is directed toward means for maintaining the voltages within the synchronous machines during the disturbances.

An important feature of our invention is the provision of means for quickly making a large increase in the exciting voltage applied to the field windings of a synchronous machine, which is a part of a transmission system, within the time that it takes the system to swing to a critical point in its electro-mechanical oscillation.

The principal feature of our invention is to go to speeds of voltage-change of the exciter far beyond anything heretofore proposed or utilized, and, by departing thus sharply from the teachings and practices of the art, we have unfolded advantages, heretofore undreamed of, which have fully justified the radical designs which we have proposed and adopted.

Heretofore, the quickest exciters have had a voltage response of 30 or 60 volts per second, over their entire voltage range. We go to a quickness of response of well over 200 volts per second and preferably about 1000 volts per second, or even more.

Moreover, excitation systems in the past have always been slow to respond to a line-voltage drop, so much so that, during the first fifth of a second after a line-voltage drop, the voltage of the exciter has not been increased even by one volt. We increase our exciter voltage by nearly 200 volts in that time.

The speeds of response just mentioned are obtained by the application of known design-principles which are not new; but the thought of resorting to such extreme designs is new, and the application of the same to transmission lines, or to synchronous machines in general, has had the effect of increasing the capacity of a superpower line, for example, by about 30%; and this large increase in performance has been obtained at an insignificant expense and by simple alterations, which we will hereinafter describe, in a very small part of the transmission system.

In an alternating-current electrical system, power flows by reason of a phase-difference between the rotors of the synchronous machines at the sending and receiving ends, or, what amounts substantially to the same thing, a phase difference in the internal or generated electromotive forces of the machines at the opposite ends of the line. At any given voltage, power and reactive kva., it is the reactance of the system which principally determines the amount of said phase difference. The reactance of the system is, therefore, the elastic element of the electro-mechanical oscillating system, because the reactance makes a quick change in the phase relation, and hence, an oscillation, necessary, before there can be a sudden change in the power generated and transmitted. The inertia element of the electro-mechanical oscillating system is the mechanical inertia of the rotors of the machines, or the fly-wheel effects of the machines.

Our quick-response excitation system, holds up the air-gap voltages of the synchronous machines of a transmission system, and thus, in effect, reduces the apparent synchronous reactances of the machines, which are included in the so-called "line" reactance of the transmission system. By this means, we not only considerably stiffen the electro-mechanical system, thereby reducing its oscillation, but we also, as will be shown hereinafter, provide means for making possible the introduction of a force strongly tending to check the phase-swing or oscillation of the system before it has reached a critical angle.

Quick-response excitation improves the transient stability of a transmission system because it tends to maintain the internal or air-gap voltages in the synchronous machines at times of fault, sudden load changes, or sudden changes in power factor.

When a fault or a considerable load-change occurs, causing a heavy current to flow suddenly in the armature of a synchronous machine, there is an immediate drop of terminal voltage, due to the leakage reactance drops. There then follows a further gradual drop in the terminal voltage, as a result of the demagnetizing effect of the armature current, which gradually reduces the effective or air-gap flux producing the internal or generated voltage.

The air-gap flux or internal voltage is reduced at a comparatively slow rate because the flux cannot be changed rapidly. Any change in the flux induces a voltage in the exciting winding which increases the exciting current, and it also induces eddy currents in all closed paths, including any damper windings that may be present. (The eddy currents in machines without damper windings are, in general, relatively small and, to simplify the discussion, will be neglected in the following explanations.)

After a certain time, which is of the order of one or several seconds, the demagnetizing armature reaction completes its reduction of the air-gap flux. In the meantime, the additional voltage induced in the field winding has become zero because the flux is no longer changing.

At the very beginning of the demagnetizing armature reaction, resulting from a sudden increment in the armature current, if the voltage of the exciter can be built up with sufficient speed, before the induced field currents have materially subsided because of the decreasing air-gap flux, it is possible to almost completely counterbalance the armature demagnetization, depending upon the speed of response of the exciter. Thus, the armature reaction may be utilized to effect a large increase in the exciting current. The voltage of the exciter is then increased merely enough to maintain the increased exciting current, without having to build it up against the reactance of the field winding.

The response of the ordinary exciter, governed by an automatic voltage regulator, is so slow that, during times of fault on an alternating-current transmission system, the fault current in the generator has ample time to demagnetize its field to a large degree before the exciter voltage increases to a point where it is effective in reestablishing the main generator flux.

The quantitative result is that, with an ordinary excitation system and a normal alternating-current generator, a three-phase short-circuit on the high-voltage terminals of the step-up transformers will reduce the induced voltage to around 50% of its initial value in one-half of a second or less. Quick-response excitation, on the other hand, has been developed to a point where, under the same conditions as above, the dip in the induced voltage will not be more than 5 to 10%, rather than of the order of 50%.

However, a three-phase short-circuit occurs but rarely upon a transmission system, because such systems are always operated with a grounded neutral. About 90% of the short-circuits are from line to ground, and most of the remainder are from line to line. For a line-to-ground short-circuit, the total demagnetizing effect is less than for a three-phase short-circuit, so that the internal voltage-drop, with our quick-response excitation system, is of the order of 2%.

When a sudden load is thrown upon a system, there is an instantaneous drop in voltage at the load point, due to the reactance of the line and the leakage reactance of the nearest synchronous machine. If a sufficiently sensitive regulator is coupled with a sufficiently quick-response exciter, the field of the synchronous machine nearest this load point may be kept from decreasing, and may even be temporarily increased. As an actual fact, during the field transient, the field circuit, as has been explained, has no effective inductance, and the only impedance which the electromotive force of the exciter has to overcome is the resistance of the field itself, so that there is a decided advantage in quick action, that is, action during the field transient of the main machine, aside from the effect of the quick-response excitation upon the stability of the system. The same exciter, if it were to operate after the field transient has dried out, would take very much longer to build up a field to the same value, because the increase in the field current would be opposed by the reactance of the field windings.

The principal difficulty in increasing the internal voltage of a machine, at times of system disturbances, is the inductance of the machine. However, if the excitation system is sufficiently rapid, it can operate to maintain the flux, and hence, the internal voltage, of the machine; because, for this condition, there is no change in flux to introduce the effect of the field inductance of the machine.

To say it in other words, it is incomparably easier to build up the exciting current of a machine by changing the exciter voltage simultaneously with the demagnetizing transient than it is to increase both the exciting current and the flux after the transient has died out.

A further important object of our invention, in addition to the above-mentioned increase in the transient limit of a transmission line, is to provide means for obtaining an increase in the steady-state limit of the line.

By our system, we greatly increase the excitation within considerably less than one-half of a second, or before the machine has had time to materially change its angular displacement of its air-gap flux. By avoiding a drop in the air-gap flux, which must be subsequently built up against the reactance of the machine, we get away from the effect of the reactance of the machine, thereby still further increasing the rate of change of the excitation. By introducing an important change in the excitation before the machine has materially changed its angular displacement or drifted toward an unstable position, we can operate the machine in a region of "artificial stability", in which its voltage and phase-position are constantly oscillating slightly about a mean value, thereby carrying the machine, or the transmission system, right up to the theoretical maximum power limit.

With the foregoing and other objects in view, which will be apparent hereinafter, our invention consists in the combinations and systems described and claimed, and illustrated in the drawing, wherein:

Figure 1 is a diagrammatic view of circuits and apparatus embodying our invention in a preferred form, and Figs. 2 to 8, inclusive are curve diagrams which will be referred to hereinafter.

Our quick-response excitation system is a combination of the following elements: (1), an exciter in which the inductance, or inductive time constant, has been reduced to a minimum; (2), a suitable voltage regulator adapted to respond quickly, and to effect its corrective action quickly, with respect to the rate at which the voltage can be changed in the exciter; and (3), a method of connecting the regulator to the bus in such manner as to insure that a voltage drop in the system is properly reflected in the regulator.

*General requisites of the exciter.*

In the matter of exciter design, it has been necessary to make some departure from conventional designs to meet the requirements of quick-response excitation.

The field inductance of an exciter is measured by the number of turns of the field circuit, multiplied by the flux per ampere of current in the field circuit; and the time constant of the field circuit is measured by the ratio of the inductance to the resistance. Therefore, any expedient which will permit a reduction in either the flux or the field turns, or will permit an increase in either the field resistance or the field amperes, without exceeding the limits fixed by design considerations, will increase the rate at which the voltage may be built up in the exciter.

The various practical means for increasing the speed of response of the exciter are as follows.

(1) Because of the contact limits of relays, a very great practical advantage is obtained by splitting the exciter field winding into several parallel circuits, as described in the Boddie Patent, No. 1,284,866, granted November 12, 1918, and assigned to the Westinghouse Electirc & Manufacturing Company. By splitting up the field into a plurality of parallel circuits, the self induction per circuit is reduced, without increasing the current per circuit beyond the limits that the regulator can handle, since there are fewer turns in series, thereby permitting standard design-proportions to be followed in the construction of the exciter and, at the same time, keeping within the voltage and current limits of the regulator-contacts. Since the resistance per circuit remains the same, the time constant of this circuit is reduced from a value which is of the order of three seconds, or even considerably more, for ordinary single-circuit exciters, to considerably less than one second, for high-speed split-field exciters.

(2) The exciter should be separately excited from an independent source, rather than self-excited, in order that the building up of the terminal voltage and the field current of the exciter shall not be mutually dependent. The effect of separate excitation is particularly marked where the exciter is called upon to build up after operating, at the instant of disturbance, with the voltage-regulator relay open, or otherwise operating at a low initial terminal exciter voltage.

(3) A shortening of the air gap of the exciter to as small a value as possible, which would be considered contrary to good D. C. machine design, according to the standards of the prior art, reduces the flux per ampere, or the stored magnetic energy; and it is thus another expedient making possible the use of a smaller number of field turns for the same excitation-current. Hence, the reactance and the time constant are reduced.

(4) Exciters should have a high rotative speed, preferably at least 500 R. P. M., in order to reduce the flux required to produce the rated direct-current voltage, thus making possible the use of a smaller number of field turns for the same exciting current, and, in this manner, reducing the reactance and the time constant of the field circuit of the exciter.

(5) The exciter should have an abnormally large number of armature conductors in order to reduce the flux requirements far below the flux densities commonly used in practice.

(6) When the armature turns are increased to very large values, as compared with ordinary machine designs, the armature reaction, which is ordinarily unimportant, becomes very objectionable, and it may become necessary to utilize a compensated exciter, that is, to use series inter-pole windings with a part thereof spread out over the pole-faces to compensate, or partially compensate, for the armature reaction.

(7) The foregoing expedients will suffice to reduce the time-constant of the exciter to such value that practically the full exciter voltage-change can be developed in one-fifth of a second, and rates of increase of the exciter voltage of the order of 1000 volts per second may be obtained. Such rates of change have been found to be adequate. However, if still higher rates of response of the exciter are needed, or if some of items (1) to (6) are omitted, for example, the split-field windings, it may be necessary to resort to a more completely laminated magnetic circuit to prevent the building up of heavy eddy currents retarding any flux-change in the exciter. When the rate if change is slower than about one-fifth of a second, the effects of eddy currents in the un-laminated portions of the magnetic circuit of most high-rotative-speed exciters are not so important, in comparison to the other time constants involved; but, for rates of response less than one-fifth of a second, and for some designs of exciters, it may be necessary or desirable to laminate the field member.

(8) A still further means for decreasing the field time constant of a separately excited exciter would be to put a block of resistance in series with the field winding. This, however, would increase the necessary excitation voltage to high values, say about four times its normal value, if the same field current were to be maintained and if the time constant were to be reduced to an advantageous degree. The high-resistance system is not considered, therefore, to be practical. It is much more satisfactory to split the exciter field into parallel circuits, thereby making possible the insertion of resistance without increasing the exciter field voltage and without exceeding the current and voltage limits of the regulator relays. In fact, the idea of dividing the exciter field into several parallel paths is at present regarded as one of the most desirable means for obtaining quick-response excitation.

*Description of apparatus.*

With the foregoing considerations in mind, we have designed a quick-excitation system, as applied to the synchronous machines at the sending and receiving ends of a transmission system, or of a section of a transmission line in the case of a sectionalized line with intermediate condenser substations, the transmission line being preferably, but not necessarily, a super-power line of the type covered by the patent to F. G. Baum, No. 1,617,007, granted February 8, 1927, and assigned to the Westinghouse Electric & Manufacturing Company.

Only one end of the line is shown, which may be regarded as either the sending end or the receiving end, as the same illustration applies to each. In order to fix our ideas, we shall regard Fig. 1, for the time being, as the sending end of the line, although it will be distinctly understood that the diagram applies also to the receiving end, and that a transmission system having two ends is to be implied.

We have shown a main generator or alternator 1, which may be a slow-speed water-wheel generator, supplying power to a transmission line 2. The generator is excited by means of a quick-response exciter 3 which, in the case of a slowly rotating main machine, such as a water-wheel generator, is separately driven at a relatively high speed, as by means of a motor 4 energized from a special alternator 5 for the purpose, the alternator being mounted on the shaft of the main generator 1 and being excited, for instance, by means of an exciter 6 on the same shaft. The motor-driven exciter 3 is energized from the special alternator 5, rather than from the main bus bars 2, in order to avoid reflecting back into the excitation system any fault which may occur in the main alternating-current system. The quick-acting exciter 3 is energized from a separate constant-potential source, such as an auxiliary exciter 7 mounted on the same shaft as the main exciter 3.

The quick-response exciter 3 is provided with the special design features hereinabove mentioned. It has a series compensating winding 8 and a plurality of separately excited shunt field windings 9 which are provided with individual regulating rheostats 10. A voltage-limiting rheostat 11 is also provided in the common supply line feeding the plurality of parallel field windings 9. The regulating rheostats 10 are adapted to be short-circuited by means of rheostat-shunting relays 12 which are controlled by means of the regulator system which will now be described.

The regulator system is responsive to the voltage of the outgoing transmission lines 2, and, in order to insure the proper response of the regulator on the occasion of a single-phase short-circuit, it is made responsive to the positive-phase-sequence polyphase voltage of the line, rather than to the single-phase voltage of any particular phase. This is necessary because, when a phase-to-phase short-circuit occurs on the network, the voltage on the short-circuited phase falls, but the voltage on one of the clear phases may actually increase for about one-half of a second, so that, if the regulator happened to be connected across this phase, it would operate to reduce the excitation rather than to increase the excitation, in response to the single-phase short-circuit on the network, as set forth in the patent to R. D. Evans, No. 1,567,581, granted December 29, 1925, and assigned to the Westinghouse Electric & Manufacturing Company. The particular postive-phase-sequence network which we employ is shown more particularly in the patent to C. T. Allcutt, No. 1,571,224, granted February 2, 1926, and assigned to the Westinghouse Electric & Manufacturing Company.

The positive-phase-sequence network comprises two voltage transformers 13 and 14 connected in open delta to the transmission line 2. The two secondary windings of the voltage transformers are connected in such manner as to have a voltage of 120° phase-difference therebetween, with a common connecting point 15 and two phases 16 and 17. The lagging phase 16 has a resistor 18 connected in series therewith; and the leading phase 17 has a 60°-impedance device 19 connected in series therewith and comprising an inductive reactor 20 and a resistor 21, the absolute value of the impedance 19 being the same as that of the resistor 18, as pointed out in the above-mentioned Allcutt Patent No. 1,571,224. The output terminals of the resistor 18 and the impedance aggregate 19 are connected together to a lead 22 which has a voltage, with respect to the neutral point 15, which is proportional only to the positive-phase-sequence voltage of the line.

By reason of the fact that the vibrating regulator, subsequently described, which we employ in our system, utilizes two coils having conductivities or admittances neither of which is negligible with respect to the other coil, or with respect to the phase-sequence network, and by reason of the fact that one of said regulator coils includes a resistor 38 (subsequently described), which is intermittently short-circuited, it has been found desirable to duplicate the phase-sequence network, in order to provide a second control line 23 also having a voltage, with respect to the neutral point 15, which is responsive to the positive-phase-sequence line voltage. In this way, when the resistor 38, in one coil-circuit is short-circuited, the phase-sequence voltage applied to the other regulator coil (namely the main control magnet 30, subsequently described) is not affected by even a small amount, thereby greatly increasing the sensitiveness of the regulator.

The requisites of a regulator, for our quick-response excitation system, are: (1) that it shall close its contacts promptly when the excitation should be increased; (2) that it shall keep the contacts closed until the generator voltage is back to normal; and (3) that the regulator should possess the necessary anti-hunting features. The first requirement is accomplished by the phase-sequence network already mentioned. The second feature requires that the raising of the exciter-voltage, as distinguished from the line-voltage, shall not open the contacts, which is the case with a widely used regulator on the market, but which is not the case with regulator hereinafter described. The third requisite is a conventional feature common to all regulators.

Our regulator is of the ordinary type heretofore utilized by the Westinghouse Electric & Manufacturing Company and comprising a floating lever 24 mounted on a floating pivot 25 at the end of a bell-crank lever 26. The floating lever is operated upon by two opposing forces, one of which is the weight of an armature member 28 which is only partially counterbalanced by a weight 29 on the other end of the lever, the neutralizing force being the upward pull of a main control magnet 30, operating upon the armature 28.

The bell-crank lever 26 operates under the influence of two opposing forces, one of which is a spring 32, and the other of which is the combined action of a counter-balancing weight 33 and the weight of an armature 34 which is transmitted to the bell-crank lever by means of a spring 35. The first-mentioned force operating on the bell-crank lever, namely, the pull of the spring 32, is assisted by the upward pull of a vibrating magnet 36 operating upon the armature 34.

The main control magnet 30 of the regulator is energized from the positive-phase-sequence connection 22 and the vibrating magnet 36 is energized from the other positive-phase-sequence connection 23 through the agency of a series resistor 38 which is adapted to be short-circuited by a separate vibrating-magnet relay 40, the operation of which will be subsequently described.

The main and vibrating magnets 30 and 36 of the regulator are connected to a double rheostat 42 for the purpose of making adjustments for different voltages. The customary dash-pots 43 and 44 are connected to the armatures of the main and vibrating magnets, respectively, because even with the quick-excitation system which we utilize, the action of the regulator would still be far too rapid for stable operation without such dash-pots.

The floating lever 24 is provided with a contact arm 46 which makes contact with a stationary contact member 47, so arranged that when the voltage drops on the main line 2, the upward pull of the main control magnet 30 decreases, causing the main contacts 46, 47 to close.

The closing of the main regulator contacts 46, 47 operates upon a master relay 50 in such a way as to close the relay contacts 51, thereby energizing the vibrating-magnet relay 40, previously mentioned, which, in turn, short-circuits the resistor 38 is series with the vibrating magnet 36 of the regulator, thereby increasing the lifting pull of said vibrating magnet on the bell-crank lever 26 and thus introducing a force tending to hasten the opening of the main regulator contacts 46, 47.

As all of the relays are similar in construction, a description of the master relay 50 will suffice. The relay is of the differential type, operating on the principle of reducing the flux in the relay in response to the closure of the contacts 46, 47 which regulate the relay, rather than attempting to establish and interrupt the entire magnetic flux, as in an ordinary single-coil relay. The relay is provided with two parallel-connected, constantly energized coils 52 and 53, which are energized from a constant-potential line 54, which may be connected to the auxiliary exciter 7. The energy for the constantly excited coils 52 and 53 is supplied through a resistor 55 which is shunted by means of a control circuit including a resistor 56, the controlling contacts 46, 47, and two parallel-connected demagnetizing coils 58 and 59 mounted on the relay and operating, upon the closure of the control contacts 46, 47, to reduce the pull of the relay on its armature 60, thereby permitting the armature to be raised by means of a spring 61, and causing the the closure of the relay contacts 51 hereinabove mentioned. The relay coils may be shunted by discharging resistors 63, and the relay contact points 51 may be shunted by a discharging condenser circuit 65, if desired.

The master relay 50, in addition to energizing the vibrating magnet 40 which causes the vibration of the main regulator, also energizes the plurality of rheostat-shunting relays 12 previously mentioned.

Upon the occurrence of a drop in the line voltage below that for which the regulator is set, the regulating rheostats 10 in the split-field circuits 9 of the main exciter 3 are short-circuited by the shunting relays 12, thereby applying full excitation to the exciter and causing it to build up its voltage very rapidly.

It will be understood that the regulator and the relays are normally in a continual state of vibration, and that a slight drop in the line voltage merely slightly increases the time during which the relays remain closed, rather than closing the relays and leaving them closed for any appreciable time.

Upon the occurrence of a great voltage drop, however, say, to 95% of the normal voltage, or less, as on the occasion of a fault on the line, the relays will remain closed for a fifth of a second or more, or until the line voltage is again brought up substantially to normal, during which time the exciter is building up its voltage to substantially its maximum value at its maximum rate.

*Explanation of "artificial stability."*

One of the most important results of our invention is that it permits the operation of a transmission line, or, in general, of synchronous apparatus, in a region of so-called "artificial stability". This may be explained, in a simple case by way of illustration, as follows:

When a synchronous motor is loaded, its rotor drops back in phase position by an angle governed by the synchronous impedance of the machine, assuming that it is connected to an "infinite bus", that is, one in which neither the magnitude nor the phase-angle of the voltage changes. The normal condition of stability is represented by the fact that an increase in angle results in an increase of torque. When the normal limit of stability is passed, the torque decreases with an increase in the phase-angle, so that this circumstance ordinarily represents an impossible condition of operation. The point of transition between the two conditions occurs when the phase angle is somewhat less than 90 electrical degrees, or more strictly, when the phase angle $\theta = \tan^{-1} x/r$, which may be referred to as the angle of pull-out.

In the expression, $\tan^{-1} x/r$, the quantity $x$ represents the total reactance of the connection between the machine and the infinite bus, or between two machines, as the case may be, including the synchronous impedance of the machine of machines and the reactance of the connection; while the quantity $r$ represents the total resistance.

For a transmission line with hand regulation, or with ordinary voltage-regulator exciter systems which do not maintain a substantially constant air-gap flux in the synchronous machines, it is shown, in a paper by C. F. Wagner and R. D. Evans to be presented at the Pacific Coast Convention of the American Institute of Electrical Engineers, September 15, 1927, that the limit of stable operation is at an angle $\theta$ between the rotors, or between the internal voltages, of the machines at the two ends of the line, which is substantially $$\theta = \tan^{-1}\left(\frac{W_r + W_s}{W_r - W_s} \tan \phi\right)$$

where $W_s$ and $W_r$ are the stored kinetic energies, or the inertia effects, of the machines at the sending and receiving ends, respectively, and $\phi$ is the argument of the complex quantity $\check{Y}_{sr}$ representing the mutual admittance of the transmission system, as in the conventional equations for the currents $\check{I}_s$, $\check{I}_r$ and the internal or air-gap machine voltages $\check{E}_s$, $\check{E}_r$, of the sending and receiving ends, as follows:

$$\check{I}_s = \check{Y}_s\check{E}_s - \check{Y}_{sr}\check{E}_r$$
$$\check{I}_r = -\check{Y}_{sr}\check{E}_s + \check{Y}_r\check{E}_r.$$

If the generator inertia effect $W_s$ approaches infinity, the limiting angle $\theta$ approaches $-\phi$, or, measured from the receiver, or lagging end, it is $\phi$. If the two inertia effects $W_s$ and $W_r$ are equal, the limiting angle $\theta$ is $\frac{\pi}{2}$ or 90°. If the receiver inertia effect $W_r$ is more than the generator inertia effect $W_s$, as is usual in practice, the limiting angle $\theta$ is greater than 90°, and as $W_r$ approaches infinity, the angle $\theta$ approaches $\pi - \phi$.

With a conventional regulator and excitation system, as heretofore used, the rate of response of the voltage to the action of the regulator-contacts is about one-fifteenth of ours, over the entire voltage range; and less than one-four-hundredth of our rate of response of the exciter during the important first fifth of a second after a drop in the line voltage. The conventional regulator and excitation system of the prior art is much too sluggish, when compared with changes in the phase displacement due to the load, to allow the vibrating regulator to be regarded in a different sense from a rheostatic regulator operating with occasional adjustment.

The operation of our quick-response excitation system in the region of "artificial stability" may be considered as follows:

In a normal system, with slow voltage regulation, or substantially constant-excitation conditions during the important initial periods of the transients, when the actual limit of stability is reached, a condenser or other synchronous machine at the end of the line will commence to drift out of step at a rate determined by the excess load, and the terminal voltage will drop by reason of the increased phase angle.

However, in our system, we effect a sudden increase in field excitation, materially increasing the internal voltage, which starts to restore the space phase-angle of the rotor, and the time phase-angle of the voltage; tending to cause an overshooting in the opposite direction and a consequent high internal voltage. A subsequent reduction of the field current will result in the initial voltage condition being regained, followed by a repetition of the cycle. This represents the state of artificial stability in which, with a sufficiently quick response, it would be theoretically possible to reach the conventional power-circle output limit for the transmission line alone, and the equivalent of perfect voltage regulation would be obtained.

Figure 2:
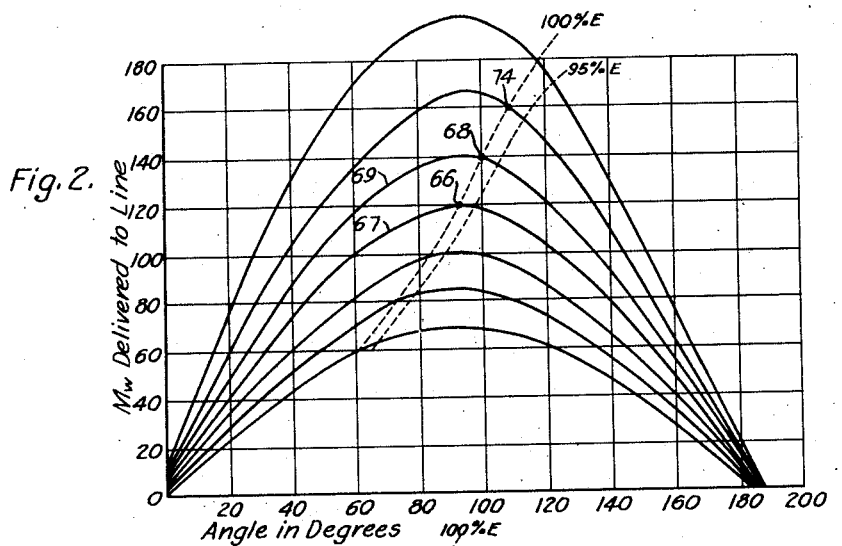

Referring to Fig. 2 of the drawing, we have plotted the relations between the power and the angle $\theta$, assuming a constant internal voltage which is defined, in this instance, as the terminal voltage plus the synchronous impedance drop of the machine, and assuming that the machine is connected to an infinite bus. In a non-salient-pole machine in which the saturation may be neglected, the conditions assumed in Fig. 2 correspond to constant field-current conditions. Thus, assuming the machine to be delivering 120 megawatts at normal voltage (if it is a generator), as indicated at 66, the excitation was left constant and the phase angles and powers were investigated, giving the curve 67. Similarly, assuming the machine to be delivering 140 megawatts at normal voltage, as indicated at 68, conditions were investigated for the change in power and phase angle for the excitation at this second assumed value, as indicated by the curve 69.

In Fig. 2 are also shown, in dotted lines, the loci of constanct terminal voltage for two values, to wit: 100% and 95%.

For a generator connected to an infinite bus, in which normal (100%) voltage is maintained, the stability limit for hand regulation will occur for that value of power for which the slope of the constant-excitation curve is zero at its intersection with the constant-voltage line. This will occur at about 120,000 kw. Up to this point, stability is inherent in the system, but beyond this point stable operation is dependent upon the action of the automatic voltage regulator and the response of the exciter.

The analysis of what occurs during the range of what has been termed "artificial stability" is essentially one of a series of transients. As a result of the magnetic inertia of the synchronous machine, particularly as assisted by our quick-response excitation system, as outlined hereinabove, the air-gap flux of the machine remains approximately constant during the initial or critical period of the transient, or it may even increase after an interval of perhaps a tenth of a second, when our quick-excitation is utilized. For this reason, our analysis of "artificial stability" conditions can best be explained in terms of curves for constant air-gap flux.

Figure 3:
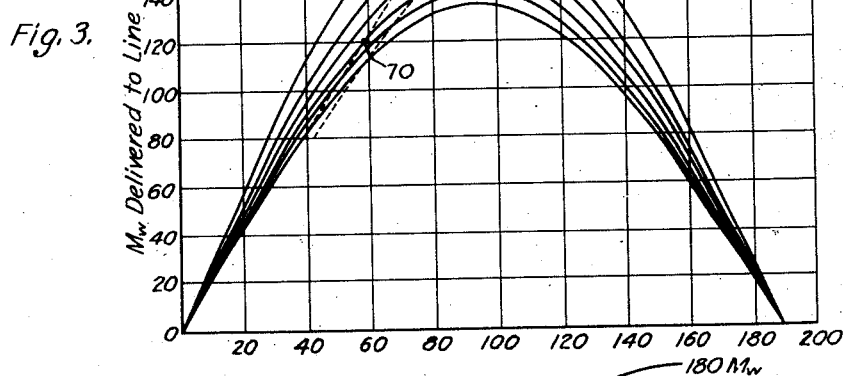

In Fig. 3 we have plotted curves showing the relation between the power and the phase angle between the air-gap voltage of the machine and the voltage of the bus, assuming the air-gap flux to be held constant at various values corresponding to 120, 140, etc., megawatts at 100% voltage, as indicated at 70 and 71, for example. These curves are obtained by assuming that the internal voltage, in this instance, is the air-gap voltage, which is equal to the terminal voltage plus the transient reactance drop of the machine.

It will be seen, therefore, that we have simplified the discussion by replacing the actual armature and field leakage reactances by the transient reactance, according to a well-known method of analysis. It thus follows that the "air-gap flux" is the flux corresponding to the "internal voltage" of the machine, which is the sum of the terminal voltage and the transient reactance drop. It is the flux which interlinks with the exciting winding, and which, when it changes, induces a current-change in the exciting winding tending to oppose the change in flux.

An additional set of curves is also necessary. The demagnetizing action is approximately proportional to the reactive kva. at the internal voltage. For this reason, the curves shown in Fig. 4 have been plotted, assuming the power to be constant at various values such as 120, 140, etc., megawatts, as in the case of the curves 72 and 73, respectively, and showing the relationship between the reactive megavolt amperes and the phase angle Θ, for the various assumed values of the power at normal voltage.

Figure 4:
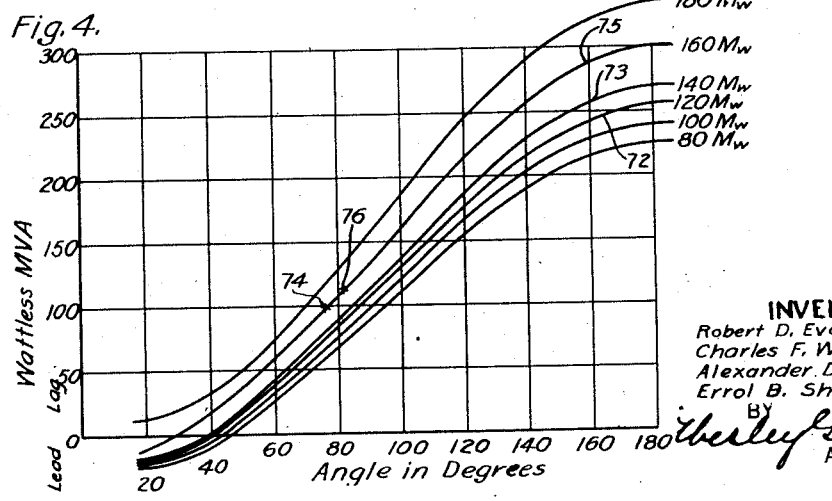

We shall now consider operation at 160,000 kw., as indicated at 74 in Figs. 2 and 3, and by the curve 75 in Fig. 4. From Fig. 2, it will be observed that this is beyond the so-called "regulation" limit, for stable operation at constant excitation. We shall first consider the case in which no regulator is provided, and follow the mechanism of pull-out; and we shall then insert the regulator and again follow the action.

Considering Fig. 3 and assuming that the system is operating at a point indicated at 74, we shall assume, as a criterion as to whether the system is stable or unstable, that the rotor is displaced in some manner, and we shall then determine whether the rotor will come back to the operating point 74 and remain there.

Figure 5:
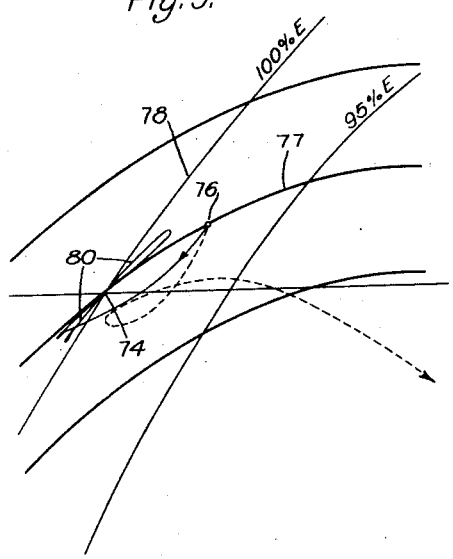

Fig. 5 is an enlarged view of the pertinent portion of Fig. 3.

Assuming the rotor to be displaced to the point 76 in Fig. 5, it will be noted that the output is greater, at this point, than the prime-mover input, which is indicated by the horizontal line through the starting point 74, and the rotor of the generator decelerates, decreasing the angle Θ. This determines the angular movement. Simultaneously, it will be observed, from Fig. 4, that the demagnetizing effect of the armature current is increased by displacing the rotor from the position 74 to the position 76, so that the air-gap flux begins to decrease. This determines the parameter of motion. Following these effects through, by a step-by-step process, taking into consideration the variation of the demagnetizing effect of armature reaction with voltage and angle, the operating point will be somewhat as shown by the dotted line in Fig. 5, pull-out occurring by the speeding up of the rotor of the generator.

Considering, now, what would be the action with a regulator and a sufficiently rapid exciter, the original displacement to the point 76 along the constant-flux line 77 will be the same, but it will be observed that the point 76 corresponds to a reduced terminal voltage. In response to the reduced potential, the regulator-contacts close and increase the exciter voltage. This, in turn, at first only tends to prevent the decrease in flux but finally actually increases it, so that the operating point follows the full line indicated. As the operating point crosses the locus of normal voltage, shown at 78, the regulator contacts open, and decrease the exciter voltage. Following this process, the operating point follows a line somewhat like that indicated by the full line 80. The final operating condition consists of narrow loops about the operating point 74, the loops probably, but not necessarily, being more or less overlapping or coincident.

*Distinction between what is old and what is new.*

While split-field exciters, as a theoretical possibility, have been known for a decade, but never applied to exciters having anything approaching the quickness of response necessary for our purpose, and while Tirrill regulators having a response quick enough for our present purposes have been known for an even longer period, and have been used as standard equipment, with slow-response exciters, by the Westinghouse Electric & Manufacturing Company, the assignee of the present application, although such regulators have not been a part of the standard equipment manufactured by any of its competitors; the utility of the particular new combination designed by us has not been known, and the new combination has never before been available to the skilled workers of the art.

Reference may be had to studies in our quick-response exciter systems reported by Messrs. R. D. Evans and C. F. Wagner in their paper on "Studies of Transmission Stability", which was presented before the midwinter convention of the American Institute of Electrical Engineers, February, 1926, an abridgement of which was published in the Journal, A. I. E. E., April, 1926, page 374; and also to the closing discussion by the authors thereof, published in the Journal, A. I. E. E., September, 1926, page 887.

*Data on actual time constants.*

From actual tests on the Southern California Edison system, and studies on other actual systems, it has been found that most of the pull-outs do not occur until about a second or more. Such systems reach their critical points in about three fourths of a second, on an average, so that the corrective measures for preventing pull-out must be fully effective in from one-half to three-fourths of a second.

Figure 6:
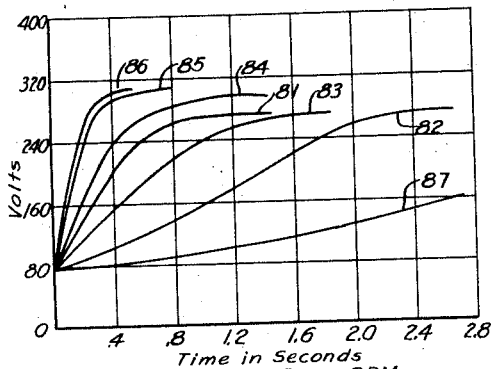

The curves of Fig. 6 will serve to show to what degree it is possible to obtain quickness of response following the short-circuiting of the regulating resistance in the exciter field circuit by means of the automatic voltage regulator. These curves are plotted in terms of exciter terminal voltage, with the main generator field as a constant-resistance load, against the time elapsed after the instant of closing of the regulator contacts.

For a convenient reference, all curves are started at an initial voltage of 75 volts. The maximum voltage of the various exciters of which the response-curves are shown in Fig. 6 ranges from 270 to 310 volts, but nevertheless, the curves give a good indication of the effects of separate excitation, high rotative speed, and the number of parallel field circuits.

Curves 82 and 83 show the response of the same exciter, first self-excited and second excited from a separate constant-voltage source.

Curves 84 and 85 show the response of exciters of approximately the same capacity and both having four parallel circuits in their field, the first one rotating at 970 R. P. M. and the second one rotating at 1200 R. P. M.

Curves 81 nd 83 show the response of the same exciter, first with its field circuits connected in three parallel paths and second with its field circuits connected in two parallel paths.

Curves 85 and 86 show the speed of response that may be obtained by taking advantage of all possible means of increasing it. Curve 85 represents a high-speed separately excited exciter with four parallel circuits. Curve 86 is the same machine with a larger number of armature conductors.

As a contrast to this exciter, curve 87 represents a slow-speed exciter as ordinarily supplied, that is, with all of the field-pole windings in series and self-excited.

It is evident from the curves that, by taking advantage of the various practical means for increasing the quickness of response, the initial rate of voltage rise, during the first fifth of a second, may be increased from about 2 volts per second, or about 0.4 volt rise in the first fifth of a second, to over 900 volts per second, or over 180 volts rise in the first fifth of a second, when the exciter is initially operating at a terminal voltage of 75 volts; and the time of raising the voltage from 75 volts to 84% of the maximum voltage of the exciter can be decreased from a value of the order of 3 to 6 seconds to a value of the order of 0.2 seconds.

Upon the occurrence of a fault, the time of response required, under the most unfavorable conditions, will be from .05 to .10 second, for the various types of rheostat-shunting regulators. Our regulator responds in a time which is of the order of one cycle, or a little less, depending upon the position of the moving parts, which is 0.017 second for a 60-cycle system. Following such lapse of time, not more than two-tenths of a second will be required for the high-speed exciter to build up to about 85% of its maximum voltage, in accordance with the quick-response curves of Fig. 6. Therefore, in less than one-quarter of a second from the time the fault occurred, 85% of the maximum voltage of the exciter may be impressed on the generator slip rings.

Figure 7:
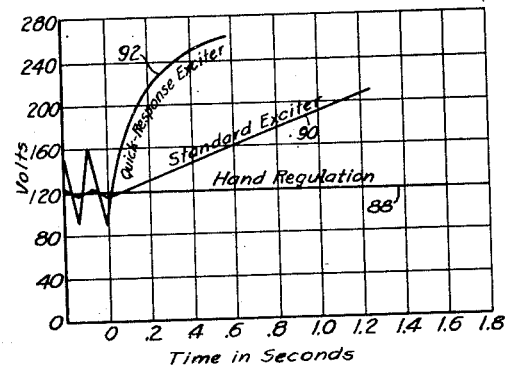
Figure 8:
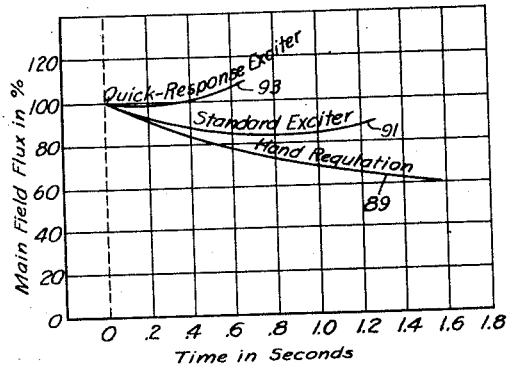

Figs. 7 and 8 present the results obtained from a test on a 10,625 kva., 100 R. P. M. machine equipped with standard and special exciters. The test consisted of throwing off full leading kva. load so as to simulate the throwing on lagging kva. as occurs during a fault, and from the data obtained curves were plotted showing the variation in the terminal voltage of the exciter and the main field flux of the alternator, respectively, with time, after the disturbance. Curves 88 and 89 show the exciter voltage and the alternator flux, respectively, with hand regulation (constant field current); curves 90 and 91 show the same quantities, when utilizing a standard exciter with an automatic voltage regulator; while curves 92 and 93 are for the quick-response excitation system herein described.

The quick-response system allows the generator field flux to dip only 2½% in value and restores it to normal within .4 seconds, whereas the standard exciter with voltage regulator allows it to fall 17% in value and restores it only after the expiration of about two seconds.

While we have shown our invention in a preferred form of embodiment and explained the principles thereof in accordance with the theories which we now believe to be correct, we do not wish to be limited thereto, but desire that the appended claims shall be accorded the broadest interpretation consistent with their language and the prior art.

We claim as our invention:

1. The combination with a synchronous dynamo-electric machine, of a quick-response excitation system therefor, having a quickness of response sufficient to make a significant increase in exciting voltage before the air-gap flux of the machine has had time to drop more than about 3% by reason of the demagnetizing armature reaction equivalent to full-load demagnetizing current suddenly drawn from the machine terminals, and a voltage-responsive regulator operative to complete a corrective action necessary to initiate an increase in the excitation-system voltage in a time interval which is very small as compared to the first-mentioned time.

2. The combination with a synchronous dynamo-electric machine, of a quick-response excitation system therefor capable of increasing its terminal voltage, from a low value of the order of 25% of its maximum value, at the rate of over 200 volts per second during the first fifth of a second of its response, and a quick-acting voltage-responsive regulator for initiating such response.

3. The combination with a synchronous alternating-current machine, of an exciter therefor, and a voltage regulator responsive to the voltage of the alternating-current machine and operatively associated with said exciter, the time constants of said regulator and exciter being such that the exciter voltage may be increased from about 25% to about 85% of its maximum value within one-quarter of a second after a drop in voltage initiating the response of the regulator.

4. The combination with a synchronous alternating-current machine, of an exciter therefor, means for driving said exciter at a speed not less than about 500 revolutions per minute, said machine having field windings divided into more than two parallel paths, a separate source of excitation for said exciter field windings, a resistor in circuit with each of said parallel paths, relays for short-circuiting said resistors, and a voltage regulator responsive to the voltage of the alternating-current machine and operatively associated with said relays, the time constants of said regulator and exciter being such that the exciter voltage may be increased from about 25% to about 85% of its maximum value within one-quarter of a second after a drop in voltage initiating the response of the regulator.

5. The combination with an alternating-current transmission line, of a synchronous machine connected thereto, a quick-response exciter for said synchronous machine, said exciter having separately excited field windings and being able to build up its voltage at an initial rate of over 200 volts per second after the application of maximum exciting voltage to said field windings, and a regulator responsive to the line voltage and adapted to effect the application of said maximum exciting voltage within less than one-tenth of a second after the occurrence of a material dip in the line voltage below normal value.

6. The combination with an alternating-current transmission line, of a synchronous machine connected thereto, a quick-response exciter for said synchronous machine, said exciter having a plurality of parallel-connected separately excited field windings and being able to build up its voltage at an initial rate of over 200 volts per second after the application of maximum exciting voltage to said field windings, and a regulator responsive to the line voltage and adapted to effect the application of said maximum exciting voltage within less than one-tenth of a second after the occurrence of a material dip in the line voltage below normal value.

7. A transmission system comprising an alternating-current line-section having a synchronous machine connected to each end thereof, characterized by a quick-response regulator and excitation system associated with each of said machines and adapted to effect a significant change in the exciting voltage applied to each of said machines before the electro-mechanical oscillation of the system, due to an impulse of the order of magnitude of a fault to ground on the transmission system, has reached a critical phase-angle beyond which recovery would be doubtful.

8. A system comprising an alternating-current line having a synchronous machine connected thereto, characterized by a quick-response regulator and excitation system associated with said machine and adapted to effect at least a 60% change in the exciting voltage applied to said machine before the electro-mechanical oscillation of the system due to an impulse of the order of magnitude of a fault to ground on the transmission system, has reached a critical phase-angle beyond which recovery would be doubtful.

9. A system comprising an alternating-current line having a synchronous machine connected thereto, characterized by a quick-response regulator and excitation system comprising an exciter having such a weak field and large number of armature conductors as to have a predominating armature reaction, said exciter being separately excited, said exciter being connected to the field windings of said synchronous machine and adapted to effect a change of at least 60% in the exciting voltage applied to said machine before the electro-mechanical oscillation of the system, due to an impulse of the order of magnitude of a fault to ground on the transmission system, has reached a critical phase-angle beyond which recovery would be doubtful.

10. A system comprising an alternating-current line having a synchronous machine connected thereto, characterized by a quick-response regulator and excitation system comprising an exciter having such a weak field and large number of armature conductors as to have a predominating armature reaction, said exciter being separately excited and being connected to the field windings of said synchronous machine, and comprising a regulator adapted to respond quickly to conditions resulting from a fault and to keep the excitation building up quickly substantially without interruption during the requisite period due to said faulty conditions.

11. As a means for increasing the stability and the power limits of a high-voltage transmission system of such reactance and length as to require large blocks of reactive power, the combination, with a line-section and two terminal synchronous machines connected to said line-section of such a transmission system, of an automatically regulated, quick-response excitation system for each of said machines, the quickness of response being sufficient to effect such a large increase in the exciting voltage, when the line-voltage drops to such extent that the two ends of the line-section commence to drift apart, as shall be sufficient to cause said ends to begin to swing toward each other in phase position, before a critical phase-angle has been reached, in the electro-mechanical oscillation of the system, beyond which recovery would be substantially impossible.

12. As a means for increasing the stability and the power limits of an electrical system comprising synchronous machines connected through reactance and having an electro-mechanical oscillation rate corresponding to about $x$ seconds to reach a phase-position beyond which stability is jeopardized, the combination, with a synchronous dynamo-electric machine connected to said system, of a quick-response exciter therefor having field windings, a separate source of excitation for said exciter field windings, and an electro-responsive regulator adapted to vary the voltage applied to said exciter field windings from said source, the quickness of response being such that a sufficiently high exciter voltage, to have a significant corrective action on any oscillation, may always be effected within less than $\frac{x}{2}$ seconds.

13. The combination with a polyphase synchronous dynamo-electric machine, of a quick-response excitation system therefor, having a quickness of response sufficient to make a significant increase in exciting voltage before the air-gap flux of the machine has had time to drop a significant amount by reason of the demagnetizing armature reaction equivalent to full-load demagnetizing current suddenly drawn from the machine terminals, and a voltage-responsive regulator always operative to complete a corrective action necessary to initiate an increase in the excitation-system voltage in a time interval which is very small as compared to the first-mentioned time, regardless of any unbalancing of the machine.

14. The combination with a polyphase alternating-current transmission line, of a synchronous machine connected thereto, a quick-response exciter for said synchronous machine, said exciter having separately excited field windings and being able to build up its voltage at an initial rate of over 200 volts per second after the application of maximum exciting voltage to said field windings, and a regulator responsive to the line voltage and adapted to effect the application of said maximum exciting voltage within less than one-tenth of a second after the occurrence of a material dip in the positive-phase-sequence line voltage below normal value.

15. The combination with a polyphase alternating-current transmission line, of a synchronous machine connected thereto, a quick-response exciter for said synchronous machine, said exciter having a separately excited field winding and being able to build up its voltage at a rate of over 900 volts per second after the application of maximum exciting voltage to said field windings, and a regulator responsive to the polyphase line voltage and adapted to effect the application of said maximum exciting voltage within less than one-tenth of a second after the occurrence of a material dip in the line voltage of any of the phases below normal value.

16. An alternating-current electrical system comprising a line and a synchronous machine and a quick-response exciting system for said machine including a regulator having a vibrating element and a regulating element both of which are responsive to the alternating-current voltage, and including a quick-response exciter, the quickness of response being sufficient to build up the exciter voltage at least substantially as fast as required by the inherent building up of the effective field voltage due to the field transient of the synchronous machine, whereby the transient stability limit of the electrical system is extended significantly beyond that obtainable with hand regulation.

17. An alternating-current electrical system comprising a line and a synchronous machine and a quick-response exciting system for said machine including a regulator having a highly damped movable element for developing a voltage-regulating torque responsive to variations in the alternating current voltage, and a lightly damped movable element for developing a vibrating torque responsive to variations in the alternating-current voltage, the time constants of said regulator and exciter being such that the exciter voltage may be increased from about 25% to about 85% of its maximum value within one-quarter of a second after a drop in voltage initiating the response of the regulator.

18. An alternating-current electrical system comprising a line and a synchronous machine and a quick-response exciting system for said machine including a regulator having a slowly movable element and a rapidly vibrating element having cooperating contact members, said slowly movable element having a relatively stiff damping means and an actuating means developing a torque directly responsive to the alternating-current voltage, said rapidly vibrating element having an actuating means normally developing a vibrating torque, including a torque means directly responsive to the alternating-current voltage for overpowering the vibrating action at the time of severe disturbance in said electrical system, said exciting system including a quick-response exciter having a rate of response sufficiently quick to build up the exciter voltage at least substantially as fast as required by the inherent building up of the effective field voltage due to the field transient of the synchronous machine, whereby the transient stability limit of the electrical system is extended significantly beyond that obtainable with hand regulation.

19. A transmission system comprising an alternating-current line-section having a synchronous machine connected to each end thereof, characterized by a quick-response exciting system for each of said machines including a regulator having a slowly movable element and a rapidly vibrating element having cooperating contact members, said slowly movable element having a relatively stiff damping means and an actuating means developing a torque directly responsive to the alternating-current voltage, said rapidly vibrating element having an actuating means normally developing a vibrating torque, including a torque means directly responsive to the alternating-current voltage for overpowering the vibrating action at the time of severe disturbance in said transmission system, the quickness of response of said exciting systems being sufficient to effect a significant change in the exciting voltage applied to each of said machines before the electro-mechanical oscillation of the system, due to an impulse of the order of magnitude of a fault to ground on the transmission system, has reached a critical phase-angle beyond which recovery would be doubtful.

20. The combination with a polyphase synchronous dynamo-electric machine, of a quick-response exciting system therefor including a regulator having a voltage-regulating element, means for energizing said element responsive to the polyphase voltage of the machine, and having a vibrating element, energizing means therefor capable of responding in such manner to the said polyphase voltage that it will cease vibrating upon the occurrence of an abnormally large drop in said polyphase voltage and will not resume vibration until normal voltage conditions are approximately again attained, said exciting system including a quick-response exciter having a rate of response sufficiently quick to build up the exciter voltage at least substantially as fast as required by the inherent building up of the effective field voltage due to the field transient of the synchronous machine, whereby the transient stability limit of the electrical system is extended significantly beyond that obtainable with hand regulation.

21. The combination with a synchronous dynamo-electric machine, of a quick-response exciting system therefor including a regulator adapted to respond quickly to conditions resulting from a fault and to keep the excitation building up quickly substantially without interruption during the requisite period due to said faulty conditions, and including a quick-response exciter having a rate of response sufficiently quick to build up the exciter voltage at least substantially as fast as required by the inherent building up of the effective field voltage due to the field transient of the synchronous machine, whereby the transient stability limit of the electrical system is extended significantly beyond that obtainable with hand regulation.

In testimony whereof, we have hereunto subscribed our names this 31st day of August, 1927.

ROBERT D. EVANS.
CHARLES F. WAGNER.
ALEXANDER D. DOVJIKOV.
ERROL B. SHAND.

DISCLAIMER 1,692,495.—*Robert D. Evans*, Pittsburgh, *Charles F. Wagner*, Swissvale, *Alexander D. Dovjikov*, Wilkinsburg, and *Errol B. Shand*, Pittsburgh, Pa. QUICK-EXCITED MACHINE AND SYSTEM OF TRANSMISSION. Patent dated November 20, 1928. Disclaimer filed February 5, 1937, by the assignee, *Westinghouse Electric & Manufacturing Company*.

Hereby disclaims from the scope of claims 1, 7, 10, 11, 12, and 13 all combinations including a regulator other than combinations including a regulator having a polyphase response which is correctly operative for single-phase faults on any phase of a polyphase line.

[*Official Gazette March 9, 1937.*]